United States Patent
Garcia et al.

[11] Patent Number: 6,065,083
[45] Date of Patent: May 16, 2000

[54] INCREASING I/O PERFORMANCE THROUGH STORAGE OF PACKETIZED OPERATIONAL INFORMATION IN LOCAL MEMORY

[75] Inventors: Raymond Eugene Garcia; Steven Douglas Gerdt, both of San Jose; John Richard Paveza, Morgan Hill, all of Calif.

[73] Assignee: International Business Machines, Inc., Armonk, N.Y.

[21] Appl. No.: 09/138,118

[22] Filed: Aug. 21, 1998

[51] Int. Cl.[7] ........................................ G06P 13/00
[52] U.S. Cl. ..................... 710/126; 710/108; 710/107; 710/129; 711/113
[58] Field of Search ................... 710/108, 107, 710/126, 129; 711/113

[56] References Cited

U.S. PATENT DOCUMENTS

| | | | |
|---|---|---|---|
| 5,140,419 | 8/1992 | Galumbeck et al. | 348/465 |
| 5,822,549 | 10/1998 | LaBerge | 710/107 |
| 5,909,559 | 1/1999 | So | 710/129 |
| 5,915,124 | 6/1999 | Morris, III | 710/9 |
| 5,933,610 | 8/1999 | Chambers et al. | 710/113 |

*Primary Examiner*—Ayaz R. Sheikh
*Assistant Examiner*—Eric S. Thlang
*Attorney, Agent, or Firm*—Ohlandt, Greeley, Ruggiero & Perle

[57] ABSTRACT

A computing system that incorporates the invention includes a host processor which is coupled to a memory subsystem via a first bus system, a controller device and a second bus system. The controller device includes memory for storing plural Scripts for replay to the host processor, for instance, via the second bus system. A Script is an instruction set used to execute operations on a controller device. Each Script includes one or more addresses where either message or status data (or other operational data) can be found which is to be inserted, prior to dispatch of the Script. During operation of the computing system, the memory subsystem is caused, as a result of its operation, to issue an instruction to the controller device to dispatch a Script to, for instance, the host processor. The controller device responds by accessing the required Script, playing the Script which results in accesses to locally stored operational data for inclusion into the Script. Local storage of this data avoids unnecessary data transfers over the bus system to the memory subsystem to obtain the required data for inclusion into a Script.

12 Claims, 2 Drawing Sheets

Initialization Phase

Execution Phase

6,065,083

INCREASING I/O PERFORMANCE THROUGH STORAGE OF PACKETIZED OPERATIONAL INFORMATION IN LOCAL MEMORY

FIELD OF THE INVENTION

This invention relates to a system for coupling a host processor and a memory subsystem in such a manner as to enable efficient transfers of data therebetween and, more particularly, to a method and apparatus for enabling a bridge circuit positioned between the host processor and memory subsystem to store packetized operational data and to thereby reduce the need for memory accesses over a bus system between the bridge circuit and the memory subsystem.

BACKGROUND OF THE INVENTION

Computer systems typically include more than one bus, each bus having attached devices which communicate locally with each other. Often, system busses and peripheral busses use different sets of standard protocols or rules to conduct data transfers between the different devices that are connected thereover. Devices for translating data that is transferred from one bus architecture to another bus architecture are often called bridges. To permit system-wide communications between devices on different bus systems, bus-to-bus bridges match the communications protocol of one bus architecture with that of another bus architecture.

Presently, "local busses" are operated in such a manner as to be more closely associated with central processor operations and are capable of running at speeds that approximate the speed of the central processor. One popular type of "local bus" architecture is the "peripheral component interconnect" (PCI) bus. A system using a PCI bus includes, in addition to the physical PCI bus, a first bridge circuit which provides interface control of transfers of data among devices connected to the PCI bus.

A second bridge circuit (also called a bus controller) provides an interface for transfer of data between a further bus system and the PCI bus. Thus, the arrangement is such that devices on the PCI bus transfer data to and receive data via the first bridge, while devices coupled to the second bus system transfer and receive data through the second bridge (or bus controller). The two bridges communicate with each other and enable data transfers between devices connected to the PCI bus and the second bus system.

Currently, a widely used bus system architecture for connecting host processors to peripheral devices, such as memory subsystems, is one which adheres to the small computer system interconnect (SCSI) protocol. The prior art includes a number of teachings regarding methods for interconnecting SCSI bus systems to PCI bus systems. Examples of such teachings can be found in U.S. Pat. No. 5,634,033 to Stewart et al. and U.S. Pat. No. 5,522,050 to Amini et al. Further SCSI bus interface control systems can be found in U.S. Pat. No. 5,454,085 to Gajjar et al., U.S. Pat. No. 5,550,991 to Keener et al. and U.S. Pat. No. 5,519,883 to White et al.

Notwithstanding the effectiveness of bridges in providing data interfaces between different bus systems, transfers of such data are time consuming and slow the overall operation of the system. This is especially true when short messages are required to be transferred between devices coupled to a PCI bus, and thence via a PCI bridge to a secondary bus controller and a host processor. Each such message transfer requires a PCI bridge to capture the PCI bus, configure a message for transmission thereover, dispatch the message, etc., etc. Just the set up time to enable either dispatch or receipt of a short message requires considerable processing time and acts to delay other system functions.

An example of such a message is a status indication that is issued by a memory subsystem to indicate the success or failure of a read/write action. Such a status message is dispatched to the host processor which initiated the read or write request.

Accordingly, it is an object of this invention to improve the processing efficiency of data transfers in a computing system which employs multiple bus systems that are used to carry relatively short message data.

SUMMARY OF THE INVENTION

A computing system that incorporates the invention includes a host processor which is coupled to a memory subsystem via a first bus system, a controller device and a second bus system. The controller device includes memory for storing plural Scripts for replay to the host processor, for instance, via the second bus system. A Script is an instruction set used to execute operations on a controller device. Each Script includes one or more addresses where either message or status data (or other operational data) can be found which is to be inserted, prior to dispatch of the Script. During operation of the computing system, the memory subsystem is caused, as a result of its operation, to issue an instruction to the controller device to dispatch a Script to, for instance, the host processor. The controller device responds by accessing the required Script, playing the Script which results in accesses to locally stored operational data for inclusion into the Script. Local storage of this data avoids unnecessary data transfers over the bus system to the memory subsystem to obtain the required data for inclusion into a Script.

DETAILED DESCRIPTION OF THE INVENTION

Figure 1:
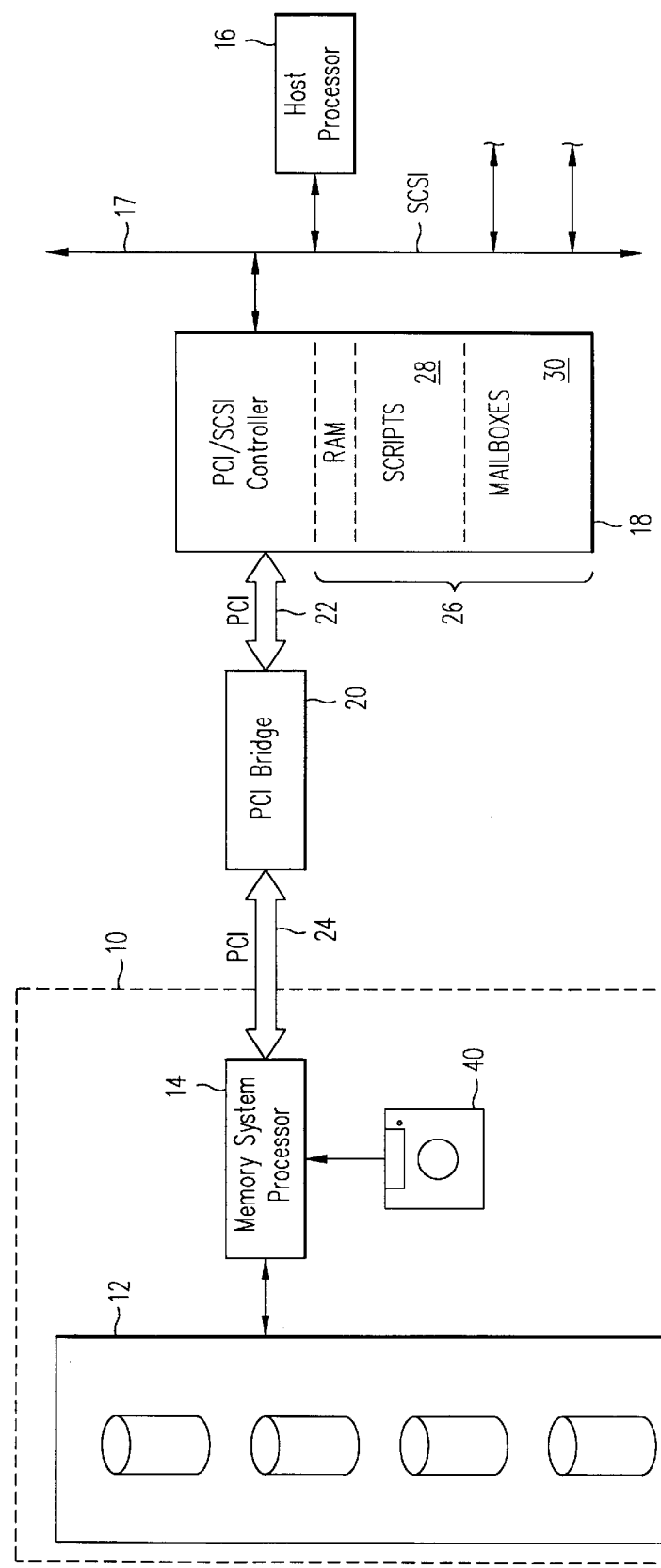
FIG. 1 is a high level block diagram of a system incorporating the invention.

Referring to FIG. 1, a memory subsystem 10 includes a plurality of disk drives 12 that are coupled to a memory system processor 14. Memory subsystem 10 thus acts as a central data repository for one or more host processors 16. Host processor 16 is coupled via a SCSI bus 17 to a PCI/SCSI controller 18. In turn, PCI/SCSI controller 18 is coupled to a PCI bridge 20 via PCI bus 22. PCI bridge 20 is, in turn, coupled to memory system processor 14 via PCI bus 24.

During operations of memory subsystem 10, various status and operational messages are required to be dispatched to host processor 16 for the purpose of overall system control and administration. Such messages include various status data regarding the success or lack of success of read/write actions. Other operational information regarding the memory subsystem 10 is also required to be dispatched at certain times during the operation of the computing system.

To enable efficient handling of status and operational messages, PCI/SCSI controller 18 is provided with a random access memory (RAM) 26 which includes capacity for the storage of plural "Scripts" 28. RAM 26 further includes a plurality of "mailboxes" 30 that serve as repositories of specific operational data that are referenced by one or more Scripts 28.

Each Script 28 is a subroutine which, upon dispatch and receipt by a recipient, enables the recipient to accomplish a required action or to register a segment of data contained within a Script. For example, one such Script may, upon dispatch from PCI/SCSI controller 18 to memory system processor 14, cause memory subsystem 10 to commence a read action in accordance with data contained within the Script. A similar Script can cause a write action to be processed by memory subsystem 10. Still another Script might comprise a message which indicates the status of a particular element of the computing system (e.g. operative, inoperative, off-line, etc.). Still other types of Scripts may be utilized to dispatch a particular operation message such as a "disconnect", "connect," "identify" or other similar actions.

Each Script 28 is associated with a particular message or operational indication. Accordingly, if memory system processor 14 successfully completes a read action, it dispatches a message to PCI/SCSI controller 18 to play a particular Script that indicates to host processor 16 the successful completion of the read action. To avoid PCI/SCSI controller 18 having to access operational data directly from memory system processor 14 in response to the aforesaid message, Script 28, when played, accesses a mailbox 30 which includes the relevant data to be included in the Script. Such data indicates the successful completion of the read action.

Accordingly, each mailbox 30 is essentially an address in RAM 26 wherein specific data can be found that is to be included in a Script. Such data is accessed when a Script is played and an address of a respective mailbox is encountered that has been embedded in the Script during initialization time.

The data in a mailbox may be reserved for a single Script or may be common data that is used by plural Scripts. In either case, the respective Script(s) will have embedded therein the address where such data can be found that is to be inserted in the Script. Accordingly, when any Script is played, and a line thereof is reached which includes the address of a particular mailbox, that mailbox is accessed and the data resident therein is automatically inserted into the Script and is played as though already present in the Script.

Figure 2:
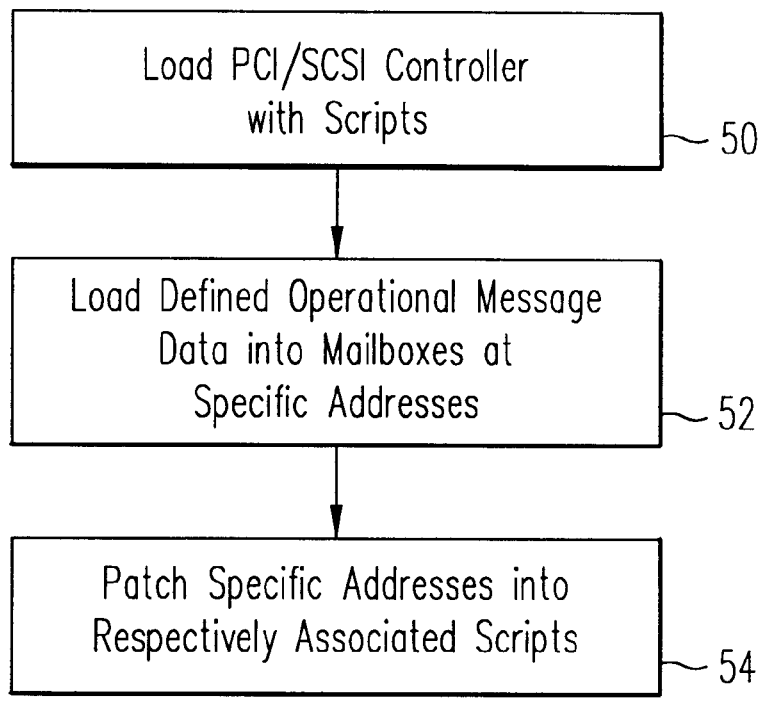
FIG. 2 is a high level logic flow diagram illustrating the operation of the method of the invention.
Figure 2:
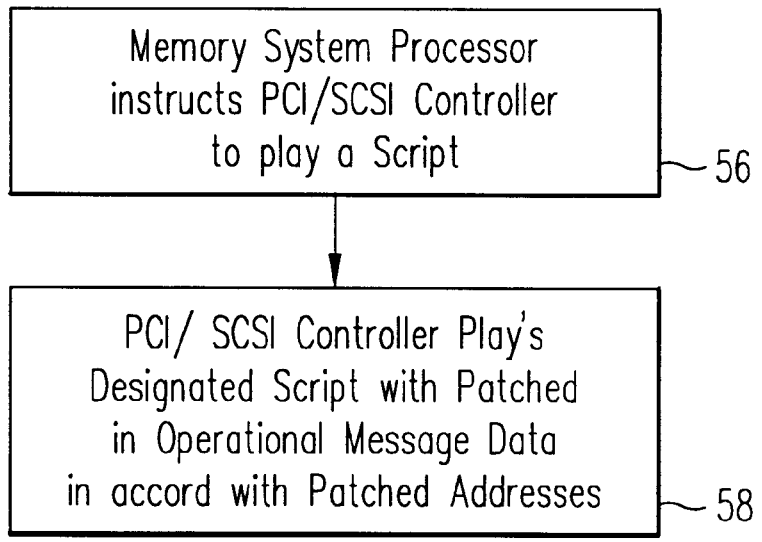

Turning now to FIG. 2, the method of the invention will be described. During an initialization phase, PCS/SCSI controller 18 is loaded with all required Scripts. The Scripts may be loaded from memory system processor 14, which accesses the particular Scripts from one or more disk drives 12 or, directly from host processor 16 (step 50). Next, operational data are loaded into "mailboxes" at preset addresses in RAM 26 (step 52). Note that there are additional predefined mailbox areas which follow the status/message mailbox locations in RAM—for other operational data. Thereafter, each Script is "patched" with the preset address(es) for the operational data that are to be inserted when the Script is played. During Scripts runtime, operational information is stored in the mailbox areas and is thereafter sent as a single memory-to-memory move, as contrasted to the many individual PCI operations that would otherwise be required to accomplish the same transfers. Such addresses define the mailboxes in RAM 26 (step 54).

During the execution phase of the procedure, assume that memory system processor 14 is to issue a status message to host processor 16. Accordingly, memory system processor 14 dispatches a message to PCI/SCSI controller 18 (via PCI bridge 20), to dispatch a designated Script to host processor 12 (step 56). PCI/SCSI controller 18 responds by accessing and playing the designated Script. During play of the Script, each line thereof which includes a mailbox address causes the addressed data in the designated mailbox 30 to be accessed. The data contained within the respective mailbox 30 is then inserted into code stream comprising the Script and is sent, for example, to host processor 16 (step 58).

It is to be understood that a Script may include one, some or many mailbox addresses, depending upon the number of pre-defined operational data values that are to be inserted therein for execution during runtime.

While the above description has assumed that each of memory system processor 14 and PCI/SCSI controller 18 have loaded therein the respectively required procedures to implement the invention, it will be understood by those skilled in the art that the software required to control the respective devices in the computer system of FIG. 1 may be contained on memory media (such as floppy disk 40 shown in FIG. 1) and loaded into the respective devices as needed.

The invention, as can be understood from the above-indicated description, avoids the need for many PCI bus interface/access actions, as most, if not all of the necessary operational data is downloaded to PCI/SCSI controller 18 during the initialization phase or is accessed at runtime via mailbox addresses in local memory. Therefore, when any Script is to be played, all that is required is for memory system processor 14, for instance, to designate a particular Script by dispatching a one or two-byte value to PCI/SCSI controller 18.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A system for coupling at least a host processor to a memory subsystem, said system comprising:

a first bus system operated in accord with a first protocol coupled to said memory subsystem;

controller means coupled to said first bus system and said host processor and including memory for storing plural Scripts, each of said plural Scripts comprising a set of instructions for performing an operation and including an address where Script data can be found which is to accompany said respective Script; and processor means for downloading said Scripts and Script data for storage in said controller means, and responsive to a command received over said first bus system for subsequently providing to said controller means, an instruction which causes play of a designated Script, said play causing said Script data, designated by an address in said designated Script, to be accessed and to be transmitted with the designated Script, thereby reducing first bus system traffic as a result of local storage of said Script in said controller means.

2. The system as recited in claim 1, wherein said Script data comprises an indication of a status of an action in said memory subsystem.

3. The system as recited in claim 1, wherein said Script data comprises message data indicating an action to be taken by a recipient of the Script.

4. The system as recited in claim 1, wherein said Script data at said address enables, at runtime, said Script to be executed by performing a single read/write operation to/from local memory in said controller means to obtain said Script data.

5. The system as recited in claim 1, further comprising:
a second bus system operated in accord with a second protocol coupled between said controller means and said host processor, said Scripts being dispatched to said host processor via said second bus system.

6. The system as recited in claim 5, wherein said controller means comprises a control processor and a bridge module, said control processor operating as an interface between said bridge module and said second bus system, said bridge module operating as an interface between said control processor and said first bus system.

7. The system as recited in claim 6, wherein said first bus system comprises a Peripheral Component Interconnect (PCI) bus system.

8. The system as recited in claim 7, wherein said second bus system comprises a Small Computer System Interface (SCSI) bus system.

9. A memory media including code for controlling a system which transfers messages and data between a host processor and a memory subsystem, said system including a first bus system operated in accord with a first protocol coupled to said memory subsystem, a second bus system operated in accord with a second protocol coupled to said host processor, a controller coupled between said first bus system and said second bus system and including memory for storing plural Scripts for replay, each Script comprising an instruction set to be used to execute an operation and including an address where Script data can be found which is to accompany said Script, said memory media comprising:

means for controlling said memory subsystem to download said Scripts and Script data for storage in said controller means; and means for controlling said memory subsystem to respond to a command received via said first bus system by providing to said controller, an instruction to dispatch one of said Scripts; and means for operating said controller to respond to said instruction by dispatching said one of said Scripts and including therewith, Script data stored in said controller that is indicated by said address included in said one of said Scripts, thereby reducing first bus system traffic as a result of local storage of said Script.

10. The memory media as recited in claim 9, wherein said Script data comprises an indication of a status of an action in said memory subsystem.

11. The memory media as recited in claim 9, wherein said Script data comprises message data indicating an action to be taken by a recipient of the Script.

12. The memory media as recited in claim 9, wherein said Script data at said address enables, at runtime, said Script to be executed by performing a single read/write operation to/from local memory in said controller means to obtain said Script data.

* * * * *